United States Patent Office.

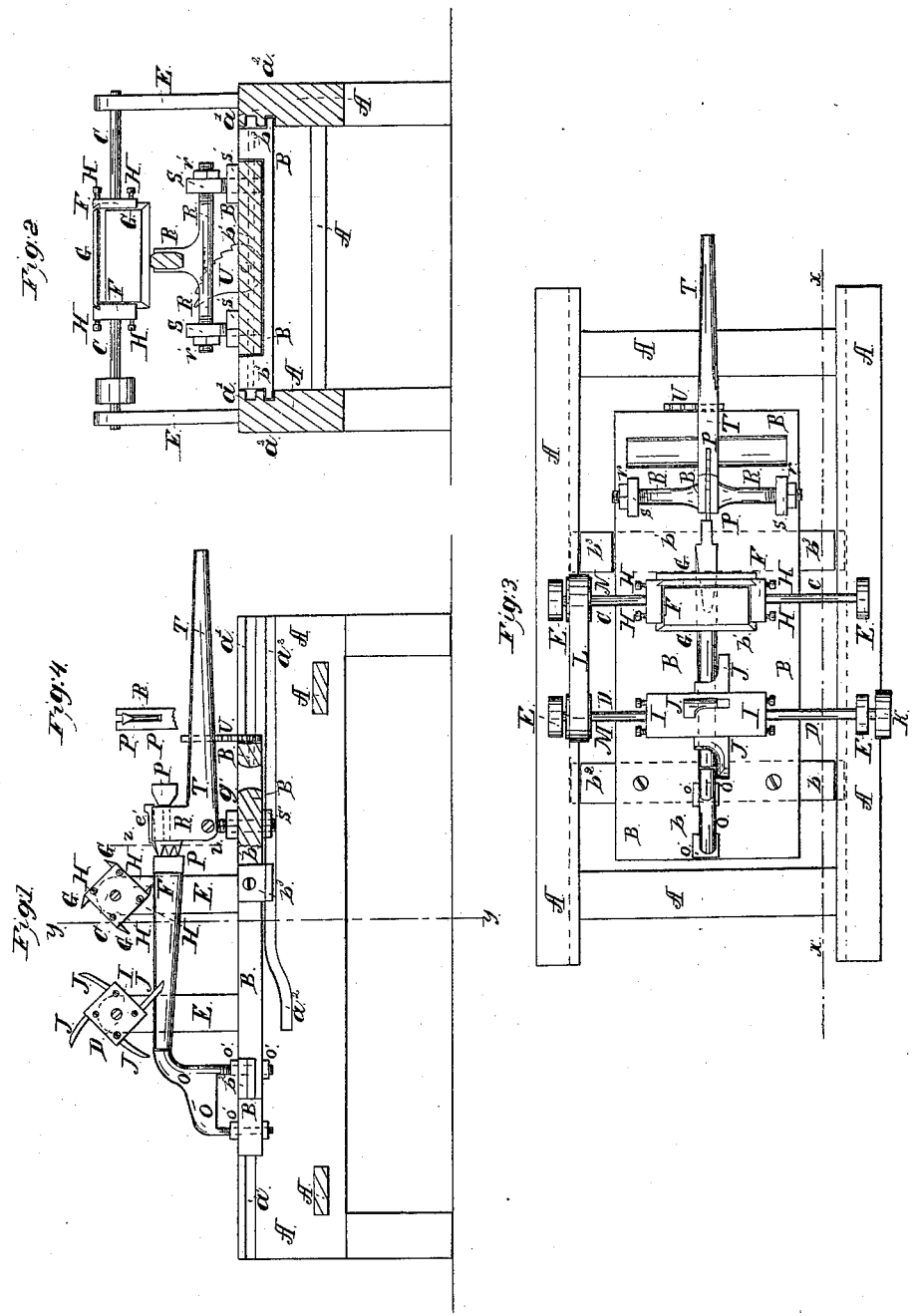

CHARLES C. DUPUE, OF WAYNE, MICHIGAN.

*Letters Patent No. 65,891, dated June 18, 1867.*

---

IMPROVEMENT IN WAGON-SPOKE MACHINES.

---

The Schedule referred to in these Letters Patent and making part of the same.

---

TO ALL WHOM IT MAY CONCERN:

Be it known that I, CHARLES C. DUPUE, of Wayne, in the county of Wayne, and State of Michigan, have invented a new and improved Machine for Forming Spokes; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved machine, taken through the line $x\ x$, fig. 3.

Figure 2 is a vertical cross-section of the same taken through the line $y\ y$, fig. 1.

Figure 3 is a top or plan view of the same.

Figure 4 is a detail sectional view taken through the line $z\ z$, fig. 1.

Similar letters of reference indicate like parts.

My invention has for its object to furnish a cheap and durable machine that can be run with one-horse power or by hand, and which will furnish a spoke at one operation; and it consists in the combination of shafts, knife-blocks, and adjustable knives with the frame of the machine; in the combination of an adjustable rest, and an adjustable pivoted dog with the sliding-frame or carriage; in the combination of a lever and notched cam with the pivoted dog and with the sliding-frame or carriage, and in combining the sliding-frame or carriage with the frame of the machine in such a way that the rear end of said frame or carriage drops down, so as to partially remove the spoke from the knives and leave the edge of the spoke square at the end that enters the hub; the whole being constructed and arranged as hereinafter more fully described.

A is the frame of the machine. E are uprights, the lower ends of which are secured to the frame A, and in the upper ends of which are formed bearings for the shafts C and D. F is a block attached to the shaft C, and to which the knives G are adjustably attached by the screws H. The knives G are designed to cut away or square the edges of the spokes, so as to leave less timber to be removed by the finishing knives. I is a block attached to the shaft D, and to which are adjustably attached the finishing knives J. The knives J are made of such a shape as to finish and give the proper shape to the sides and edges of the spokes. The shaft D is revolved by means of a pulley, K, or crank attached to one of its ends, and the shaft C is connected to and receives motion from the shaft D, by means of the band L and pulleys M and N, as shown in fig. 3. B is the sliding-frame or carriage, to the platform $b^1$ of which is attached the guides $b^2$ and $b^3$. Upon the ends of the guide $b^2$, which is immovably attached to the said platform $b^1$, are formed tongues, which enter and slide back and forth in the grooves $a^1$, as shown in fig. 1. The guide $b^3$ is pivoted to the platform $b^1$, as shown in fig. 1, and has tongues formed upon its ends, which enter and work in the grooves $a^2$ formed in the frame A of the machine. The inner ends of the grooves $a^2$ incline downwards, as shown in fig. 1, so that, as the carriage B moves forward, and the rear end of the spoke has passed the cutters G, the rear end of said carriage may be lowered so much that the knives J cannot round off the edge of the said spoke, but will leave it square. O is a rest by which the forward or top end of the spoke is held while being operated upon. The rest O is adjustably attached to the carriage B by the nuts $o'$, so that it may be raised or lowered vertically to adapt it to hold large or small spokes, as may be desired. P is the dog by which the rear or bottom end of the spoke is held while being operated upon. The dog P is pivoted to the adjustable support R, so that by revolving the dog P the spoke may be turned over to finish its other side. P' is a key working in a groove in the support R, which key, when pushed forward, holds the dog firmly in position, and when drawn back allows the dog to be revolved to turn the spoke. The support R is pivoted to the ears S, and is adjusted laterally by the nuts $r'$. The ears S are secured to the carriage B, and made adjustable vertically by the nuts $s'$, so that the dog P may be adjusted laterally to bring the spoke into line, and vertically to hold large or small spokes, as may be desired. T is a lever, the end of which is attached to the support R for the purpose of clamping the spoke between the rest O and the dog P. U is a cam, the curved edge of which is notched to take hold of the lever T and hold it in any position in which it may be placed in clamping the spoke. The notched cam U is pivoted to the end of the carriage B, as shown in figs. 1, 2, and 3.

What I claim as new, and desire to secure by Letters Patent, is—

Securing the spoke in position to be acted upon by means of the pivoted dog R, substantially as herein shown and described.

<div style="text-align: right;">
his<br>
CHARLES C. × DUPUE.<br>
mark.
</div>

Witnesses:
    WILLARD EDMOND,
    JAMES DAGAW.